United States Patent [19]

Falk et al.

[11] 4,194,761
[45] Mar. 25, 1980

[54] SUSPENSION SYSTEM FOR TRACKED VEHICLES

[75] Inventors: Alfons B. Falk, Bonassund; Antero E. Stenman, Ornskoldsvik; Svante Wikland, Sjalevad, all of Sweden

[73] Assignee: Aktiebolaget Hagglund & Soner, Ornskoldsvik, Sweden

[21] Appl. No.: 906,682

[22] Filed: May 16, 1978

[30] Foreign Application Priority Data

May 18, 1977 [SE] Sweden .............................. 7705890

[51] Int. Cl.² .............................................. B62D 55/02
[52] U.S. Cl. ..................................... 280/705; 267/57; 280/700
[58] Field of Search ............... 280/705, 700, 721; 305/21, 22, 23, 24, 25, 26, 27, 28; 180/5 R; 267/57

[56] References Cited

U.S. PATENT DOCUMENTS

| | | | |
|---|---|---|---|
| 2,702,701 | 2/1955 | Thorne | 280/721 |
| 2,811,347 | 10/1957 | Cass | 267/57 |
| 3,338,325 | 8/1967 | Morse | 180/6.7 |
| 3,371,940 | 3/1968 | Sinclair | 280/705 |
| 3,554,616 | 1/1971 | Litvinov | 267/57 |

FOREIGN PATENT DOCUMENTS

| | | | |
|---|---|---|---|
| 95482 | 4/1939 | Sweden | 280/705 |
| 114105 | 5/1943 | Sweden | 280/705 |
| 109016 | 11/1943 | Sweden | 267/57 |
| 116802 | 7/1946 | Sweden | 267/57 |

*Primary Examiner*—Philip Goodman
*Attorney, Agent, or Firm*—Cushman, Darby & Cushman

[57] ABSTRACT

A suspension system for a tracked vehicle has a hull provided with double crawler tracks positioned on either side of the hull. Each crawler track runs around a track drive wheel, track roller assemblies and a take-up idler. A torsion unit assembly connects each track roller assembly to the hull. The torsion unit assembly includes a plurality of torsion units mechanically connected in series, with the torsion unit at one end of the series being fixed to the hull and the torsion unit at the other end of the series being connected to and suspending the respective track roller assembly in order to obtain a large amount of suspension travel for the track roller.

23 Claims, 6 Drawing Figures

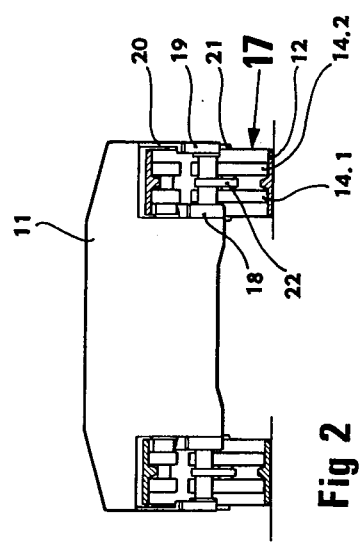
Fig 2
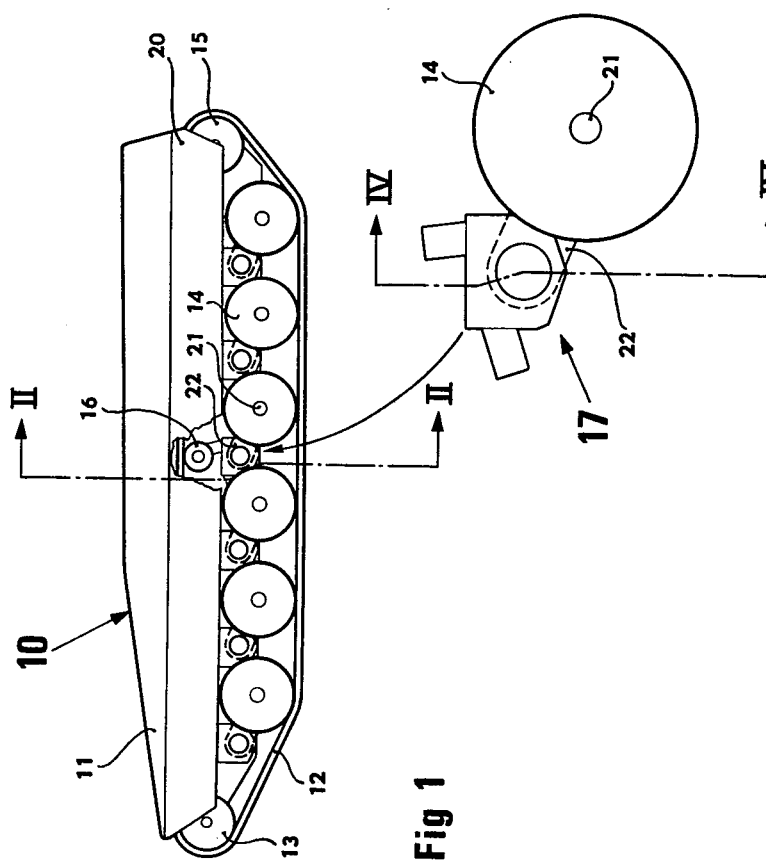
Fig 3
Fig 1

SUSPENSION SYSTEM FOR TRACKED VEHICLES

The present invention relates to a suspension system for tracked vehicles with double crawler tracks positioned on either side of the hull, each crawler track running round a track drive wheel, the track rollers and a take-up idler, with or without supporting rollers.

BACKGROUND

Usually in heavy vehicles each track roller, or each pair of track roller "twins", is suspended using a torsion bar one end of which is anchored to one side of the hull and which passes through the body of the vehicle to the twin roller opposite. This type of long torsion bar has been developed to assimilate the large movements that each track roller is subjected to when crossing rough terrain.

The standard design has a number of disadvantages, particularly for combat vehicles. These disadvantages include:
- the whole width of the vehicle must be utilized to obtain sufficient travel in the suspension,
- long torsion bars reduce the available space inside the vehicle,
- the vehicle must be made taller because the torsion bars have reduced the available interior space. In the case of large vehicles this can increase the weight by approximately 2 tons because the bars are fully protected by armour plating,
- tall vehicles present a larger target,
- the structure is fixed, i.e. it is not possible to raise or lower the vehicle in order to alter the ground clearance when driving cross country or to take up a high or low combat position,
- the track rollers on one side become longitudinally displaced in relation to the track rollers on the other side due to the length of the torsion rods and because they lie adjacent to each other.

SUMMARY OF THE INVENTION

The aim of this invention is to eliminate the above disadvantages by providing each track roller assembly, that is each roller or pair of track roller "twins", in a tracked vehicle with a compact suspension system that does not encroach on the available interior space and which, in addition to allowing the track rollers a large amount of travel, also permits the body to be raised or lowered to facilitate driving cross country and to enable the vehicle to assume a high or low combat position. A further aim is to make the construction of the suspension system simple and to enable it to be assembled and dismantled without having to disturb the internal sections of the body.

The above aim and other are realized by a suspension in which there is a torsion unit assembly connecting each track roller assembly to the hull, said torsion unit assembly including a plurality of torsion units mechanically connected in series, with the torsion unit at one end of the series being connected to the hull and the torsion unit at the other end of the series being connected to and suspending the respective track roller assembly in order to obtain a large amount of suspension travel for the track roller.

BRIEF DESCRIPTION OF THE DRAWINGS

FIG. 1 is a schematic elevational view of a tracked vehicle with double crawler tracks;

FIG. 2 is a sectional view, on an enlarged scale, taken on the line II—II in FIG. 1;

FIG. 3 is a detail view, on an enlarged scale, of a part of FIG. 1;

DETAILED DESCRIPTION

Figure 4:
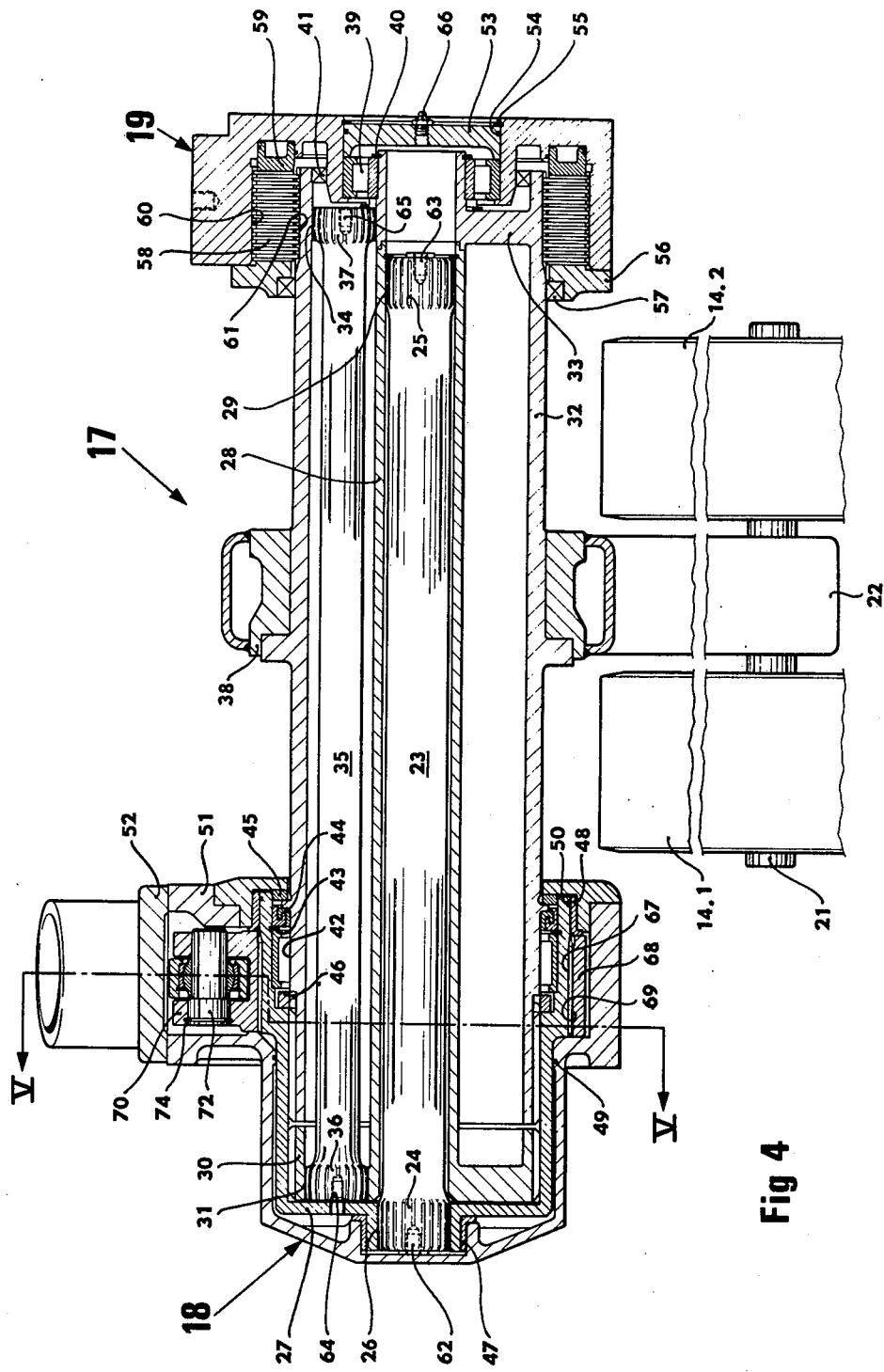
FIG. 4 is a sectional view, on an enlarged scale, of the track roller unit used in the vehicle taken on the line IV—IV of FIG. 3.

FIGS. 1 and 2 show a tracked vehicle, generally designated 10, including a hull 11 with a crawler track 12 located on each side with a track drive wheel 13, a number of track roller assemblies which may have the form of twin track rollers 14, a take-up idler 15 plus a number of supporting rollers 16 supporting the upper section of the crawler track between the track drive wheel 13 and the take-up idler 15. The twin track rollers 14, the inner roller being designated 14.1 and the outer roller 14.2, are parts of a track roller unit generally designated 17, the inner bearing housing 18 being anchored to the hull 11 and the outer bearing housing 19 being attached to a supporting panel integrated in the hull 11, which also protects the upper section of the crawler track 12. The twin track rollers 14 are mounted on an axle 21 which is attached to a mounting lever 22 which is connected to a track roller unit or torsion unit assembly 17.

FIG. 3 is a detail of part of FIG. 1 and is intended to clarify the section shown in FIG. 4.

FIG. 4 shows the construction of the track roller unit. One of the basic concepts of the invention is the location of the suspension for track rollers 14 within the available space inside the crawler track 12 which is not normally utilized, thereby making it unnecessary to use precious space inside the hull 11 which is of particular importance in the case of combat vehicles where the entire hull must be armour plated. The suspension of the vehicle plus the raising and the lowering of the track rollers 14 is effected in this invention by constructing a torsion axle system between the inner and outer bearing housings, 18 and 19 respectively, which, despite the shortness of the axles, allows just as much suspension travel as the conventional, through-the-hull torsion axles and which furthermore permits the track rollers 14 to be raised or lowered. A central torsion axle 23, with splines 24 and 25 at both its ends, has one end anchored in an axially-splined hole 26 positioned in an adjustable hub 27 in the inner bearing housing 18. The other end of the torsion axle 23 at the outer bearing housing 19 is connected to the outer section of a torsion axle sleeve 28 with internal splines 29 which is situated round the torsion axle 23. The part of the torsion axle sleeve 28 which lies inside the inner bearing housing 18 is provided with an external flange 30 which contains, apart from the torsion axle sleeve 28, a number of splined holes 31 positioned in a circular formation round the torsion axle 23. The aforementioned torsion axle sleeve 28 is surrounded by a mounting lever sleeve 32, the section that is located in the outer bearing housing 19 being provided with a second flange 33, inclining radially inwards, and containing the same number of splined holes 34 as there are in the first flange 30. These splined holes 34 are situated in a circle round the torsion axle 23, a circle with the same radius as that surrounding the torsion axle 23 at its other end. A number of torsion bars 35, with splines 36 and 37 at either end, also referred to as torsion element units, are positioned between the splined holes 31 and 34 in the first and second flanges, 30 and 33 respectively. The mounting lever 22 is attached to the mounting lever sleeve 32 by a boss 38. One end of the mounting lever sleeve 32 with the flange 33 is mounted in a bearing 39 in the outer bearing housing 19 and secured with a circlip 40 and a seal 41. The other end of the mounting lever sleeve 32 is mounted in a bearing 42 in the hub 27. The aforementioned bearing 42 is secured by a circlip 43, a labyrinth seal 44 and axial washers 45 and 46. The hub 27 is then mounted in the inner bearing housing 18 with sealing elements 49 and 50 via the bearing elements 47 and 48.

The inner bearing housing 18 is equipped with a bearing cover 51 and a first cover 52 and the outer bearing housing 19 with bearing cap 53 and a seal 54 plus a sealing cover 56 with seal 57.

A laminated-type absorber 58 with a conventional take-up piston 59 is provided in the outer bearing housing 19 to dampen the movements of the mounting lever 22 when the torsional axle system is in operation. Puller holes 62 and 63 in the torsion axle 23 and puller holes 64 and 65 in the torsion bars 35 are provided for dismantling purposes. A lubrication nipple 66 is also shown.

The hub 27 is connected via the external splines 67 to a collar 68 which has internal splines 69. The collar 68 is provided with two lugs 70 and 71, see also FIG. 5, to which are attached two hydraulic cylinders, generally designated 75 and 76, via axle bolts 72 and 73 and locking rings 74.

Figure 5:
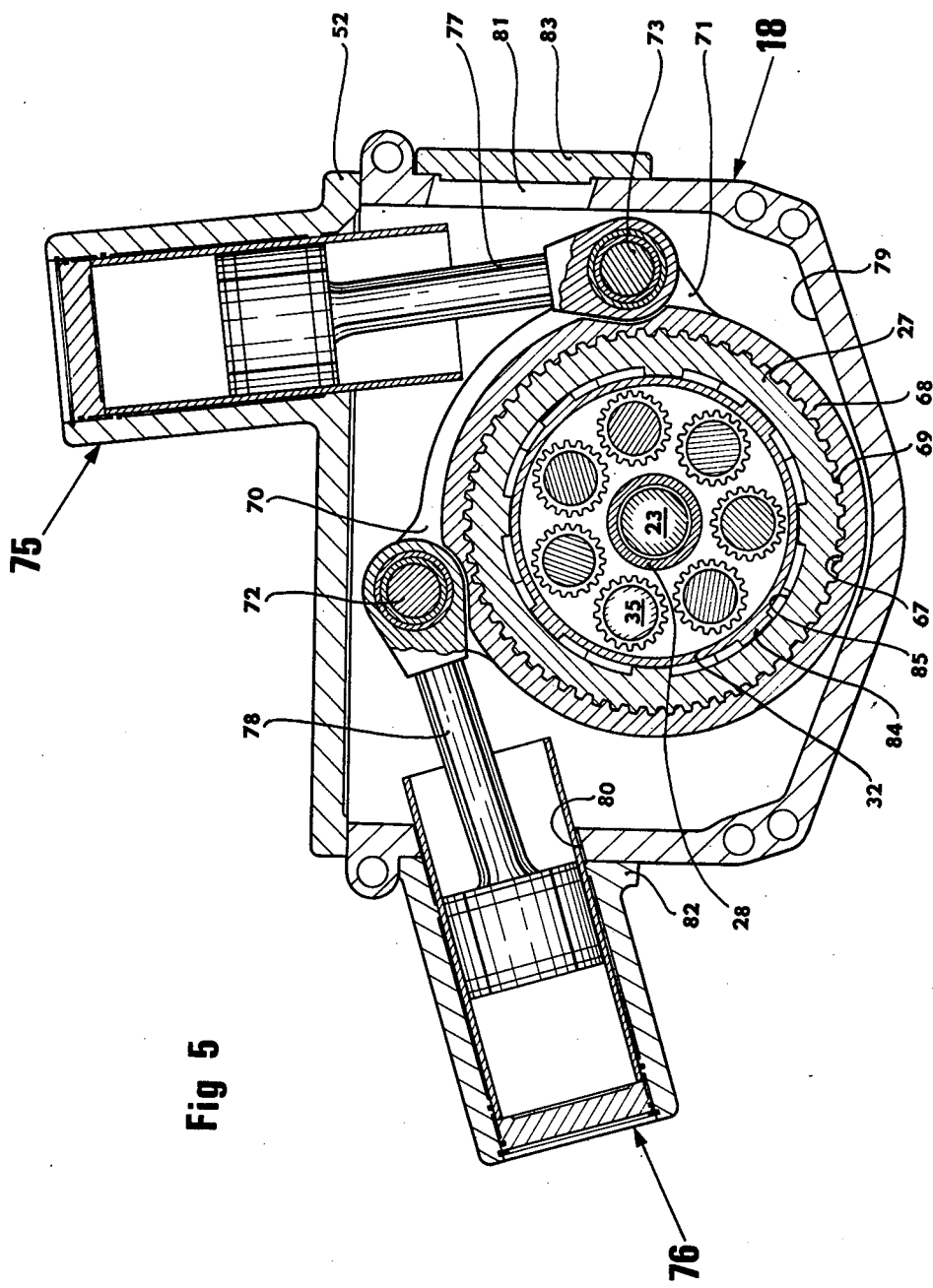
FIG. 5 is a sectional view taken on the line V—V in FIG. 4.

FIG. 5 shows how the position of the hub 27 can be changed, i.e. the hub 27 can be turned, using the two hydraulic cylinders 75 and 76 whose pistons 77 and 78 respectively are connected to the lugs 70 and 71 and the collar 68. One lug 71 also acts to limit the turning movement of the collar 68 and thereby that of the hub 27. This occurs when the lug 71 comes up against the surface 79 of the inner bearing housing 18. The position of the entire torsion axle system 23, 28, 32 and 35 can be changed by activating the hydraulic cylinders 75 and 76 so that the mounting lever 22 adopts the desired height, thereby fulfilling the demand and requirement for the vehicle 10 to assume a high or low locomotive position or a high or low combat position. The hydraulic cylinders 75 and 76 are single acting, i.e. pumping oil into the cylinders raises the vehicle 10 while the vehicle's own weight is used to evacuate the oil when a lower position is required.

The inner bearing housing 18 is designed with a rotatable first cover 52 where one of the hydraulic cylinders 75 is positioned so that the track roller units 17 will be symmetrically positioned on both sides of the vehicle 10 and in order to ensure that the track rollers 14 lie opposite each other. Furthermore the cover 52 is equipped with two apertures 80 and 81, the former being provided with a second cover 82 which houses the second hydraulic cylinder 76, the latter aperture 81 having a third cover 83 which allows the second cover 82 with the hydraulic cylinder 76 to be interchanged with the third cover 83.

Figure 6:
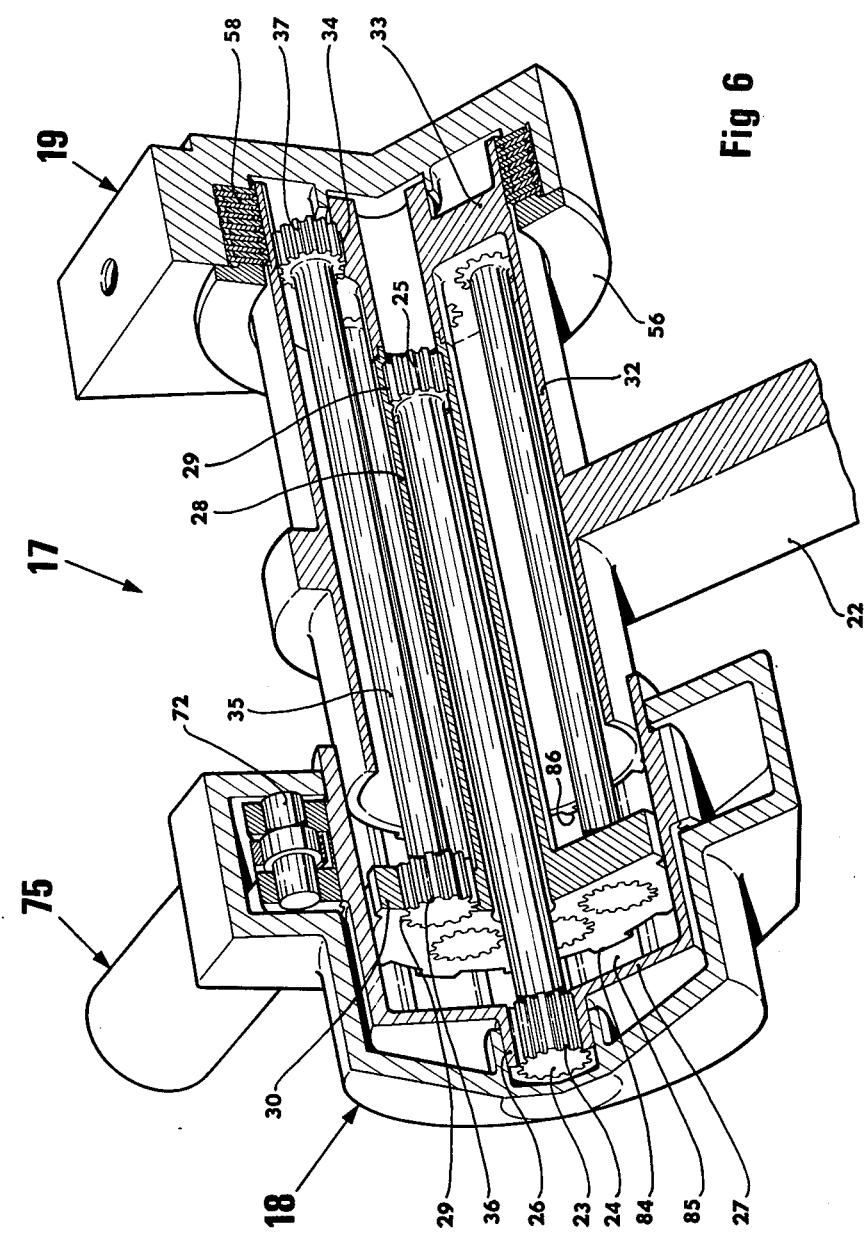
FIG. 6 is a simplified view, in perspective, of the track roller unit as shown in FIG. 4.

This description of the function of the track roller units 17 principally refers to the section diagrammatically represented by the perspective drawing in FIG. 6. The travel of the suspension, i.e. the ability of the mounting lever 22 to turn, is achieved by three torsion units constructed in series, viz the torsion axle 23, the torsion axle sleeve 28 and the torsion bars 35. The hub 27 remains stationary at all the different height positions that the vehicle 10 adopts with the result that the part of the torsion axle 23 which lies inside the inner bearing housing 18 remains stationary in relation to the hull 11. The turning movement is transmitted through the torsion axle 23 via its splines 25 at the outer bearing housing 19 to the splines 29 of the torsion axle sleeve 28. The turning movement is further increased in the torsion axle sleeve 28 and along its length up to the inner bearing housing 18 and up to the first flange 30 which is attached to the torsion axle sleeve 28. The turning movement is subsequently transferred through the torsion bars 35 with splines 36 which have been inserted in the splined holes 31 in the first flange 30 and is increased through the torsion bars up to their anchorage point in the second flange 33 which is situated in the outer bearing housing 19. The total turning movement which has been achieved is then transferred through the splines 37 in the torsion rods 35 to the splined holes 34 in the aforementioned second flange 33 which is attached to the mounting lever sleeve 32. As the mounting lever 22 is attached to the mounting lever sleeve 32 the three torsion units 23, 28, 35 in series only allow the mounting lever 22 to move slightly thereby minimizing the travel of the track rollers 14.

The amount of travel in the axle system's suspension can be altered by using torsion bars 35 of another diameter. A larger amount of travel can be obtained by using thinner torsion bars 35. 7 torsion bars were used in the embodiment but the number can be altered to provide the suspension characteristics required.

As the torsion bars 35 are deflected out of line under load, their splines 36 and 37 have been provided with a curved profile and furthermore an angle-limiting device has been incorporated. The first flange 30 on the torsion axle sleeve 28 has been equipped with a number of axial teeth 84 and the hub 27 contains a number of interlocking axial grooves 85. The teeth 84 engaging in the grooves 85 mean that the torsion axle 23 and the torsion axle sleeve 28 are always subjected to the maximum torsional movement, enabling them to be constructed with smaller radii thereby allowing one to gain the advantages offered by a greater amount of travel in the suspension. Another advantage of the teeth 84 and the grooves 85 is that the suspension becomes progressively harder, being soft when transversing small obstacles and giving a harder ride over rougher terrain.

A further stop device has been incorporated to ensure that the suspension travel does not exceed the maximum permissable that the torsion bars 35 can tolerate. The stop is effected by providing the end of the mounting lever sleeve 32 that is situated at the inner bearing housing 18 with a number of external axial teeth 86 which engage in the aforementioned grooves 85 in the hub 27.

The suspension system has the same method of functioning irrespective of how the vehicle 10 is standing due to the fact that activating the hydraulic cylinders 75 and 76 turns the hub 27 and thereby also the torsion axle system 23, 28, 35 and the mounting lever sleeve 32. The cylinders 75, 76 and the stop devices 84, 85 and 86, as they are connected to the hub 27, perform five functions:

to hold the hub 27 in position for the torsion axle 23, to stop, through the hub 27, the turning movements in the torsion units 23 and 28, to stop, through the hub 27, the turning movement in the torsion bars 35, to limit, through the hub 27, the turning movement in the mounting lever sleeve 32, to limit the forces that can develop in cases of severe overloading by connecting the hydraulic cylinders 75 and 76 to a pressure-limiting valve (not shown).

As mentioned earlier the suspension system is dampened by a laminate-type absorber 58, the shocks being taken up by the absorber as driving conditions require.

The entire track roller unit 17 and its related parts, which are very lightweight, can be installed and dismantled without having to remove parts of the vehicle's body 11. This is a considerable advantage where combat vehicles are involved.

The invention is not limited to the embodiment described above. Several modifications to the shape, components, devices and dimensions are possible within the framework of the following patent claims.

What is claimed is:

1. A suspension system for a tracked vehicle having a hull provided with crawler tracks positioned on either side of the hull, each crawler track running round a track drive wheel, track roller assemblies and a take-up idler; a torsion unit assembly for each roller assembly, each torsion unit assembly including a plurality of torsion units mechanically connected in series and a mounting lever sleeve surrounding the torsion units and connected to one end of the series of torsion units; means connecting the other end of the series to the hull; an inner bearing housing anchored to the hull and journalling one end of the sleeve; an outer bearing housing anchored to the hull by means of a supporting panel which lies laterally outward of the crawler track and which is integrated with the hull, said outer bearing housing journalling the other end of the sleeve; and a mounting lever fixed to the sleeve and supporting the respective roller assembly.

2. A suspension system as in claim 1 wherein one of the torsion units comprises a torsion axle one end of which is inserted in a hub in the inner bearing housing and the other end being inserted in the outer bearing housing.

3. A suspension system as in claim 2 wherein the torsion axle is connected into a splined hole in the hub via splines.

4. A suspension system as in claim 2 wherein the hub is rotatably adjustable in order that the torsion units can be turned thereby making it possible to locate the respective track roller assembly at various heights.

5. A suspension system as in claim 4 including at least one hydraulic cylinder for rotatably adjusting the hub.

6. A suspension system as in claim 5 including a collar provided on the exterior of the hub said collar having a lug to which is connected the hydraulic cylinder.

7. A suspension system as in claim 6 wherein the collar is connected to the hub via splines.

8. A suspension system as in claim 6 wherein the lug is located such that turning movement of the collar and thereby also of the hub in one direction is limited by contact of the lug with the inner surface of the inner bearing housing.

9. A suspension system as in claim 2 wherein the torsion axle is splined at the outer bearing housing to a torsion axle sleeve which encloses the torsion axle and which extends to the inner bearing housing.

10. A suspension system as in claim 9 wherein the torsion axle sleeve is connected at the inner bearing housing to a third torsion unit which extends to the outer bearing housing.

11. A suspension system as in claim 10 wherein the third torsion unit comprises a number of torsion bars positioned in a circular pattern around the torsion axle sleeve.

12. A suspension system as in claim 11 wherein the torsion bars are connected to the torsion axle sleeve via a flange on the sleeve.

13. A suspension system as in claim 12 wherein the torsion bars are connected via splines in splined holes in the flange.

14. A suspension system as in claim 11 wherein the torsion bars are connected to the mounting lever sleeve via a flange on the sleeve.

15. A suspension system as in claim 14 wherein the torsion bars are inserted via splines in splined holes in the flange.

16. A suspension system as in claim 15 wherein the torsion bars have splines with curved profiles.

17. A suspension system as in claim 11 including an absorber between the mounting lever sleeve and the outer bearing housing to absorb the shocks from the track roller assembly.

18. A suspension system as in claim 12 wherein the torsion bars are supplied with an angle-limiting device in order to limit the amount that the bars are displaced out of line.

19. A suspension system as in claim 18 wherein the angle-limiting device includes a number of axial teeth positioned on the flange round the torsion axle sleeve, said teeth engaging in axial grooves positioned in the hub.

20. A suspension system as in claim 18 including a further limiting device to hold the suspension travel under the maximum permissable that the torsion bars can tolerate.

21. A suspension system as in claim 20 wherein said limiting device includes a plurality of axial teeth on the mounting lever sleeve, said axial teeth engaging in grooves in the hub.

22. A suspension system as in claim 1 wherein the plurality of torsion units are disposed parallel to each other in generally coextensive relationship.

23. A suspension system for a tracked vehicle having a hull provided with crawler tracks positioned on either side of the hull, each crawler track running round a track drive wheel, track roller assemblies and a take-up idler; for each track roller assembly an inner bearing housing anchored to the hull and an outer bearing housing anchored to the hull by means of a supporting panel integrated with the hull; a torsion unit assembly positioned between the inner and outer bearing housings, the torsion unit assembly including first, second and third torsion units mechanically connected in series, the first torsion unit including a torsion axle one end of which is inserted in a hub in the inner bearing housing and the other end being splined at the outer bearing housing to the second torsion unit which includes a torsion axle sleeve enclosing the torsion axle, said torsion axle sleeve extending to the inner bearing housing, said third torsion unit being connected to said torsion axle sleeve at the inner bearing housing and extending to the outer bearing housing; means connecting one end of the series of torsion units to the hull; and means connecting the other end of the series of torsion units to the respective track roller assembly to suspend the latter.

* * * * *